United States Patent [19]
Sekine

[11] Patent Number: 5,822,129
[45] Date of Patent: Oct. 13, 1998

[54] PROJECTION LENS SYSTEM

[75] Inventor: Atushi Sekine, Kasukabe, Japan

[73] Assignee: Nikon Corporation, Tokyo, Japan

[21] Appl. No.: 743,094

[22] Filed: Nov. 4, 1996

[30] Foreign Application Priority Data

| Nov. 7, 1995 | [JP] | Japan | 7-288305 |
| Mar. 12, 1996 | [JP] | Japan | 8-055137 |
| Apr. 9, 1996 | [JP] | Japan | 8-086764 |

[51] Int. Cl.$^6$ .................................................. G02B 21/02
[52] U.S. Cl. .......................... 359/651; 359/649; 359/757; 359/764
[58] Field of Search .................................. 359/649–651, 359/680–682, 713–717, 793, 758, 764, 763, 757

[56] References Cited

U.S. PATENT DOCUMENTS

| 4,989,961 | 2/1991 | Yoshioka | 359/713 |
| 5,278,698 | 1/1994 | Iizuka et al. | 359/682 |
| 5,442,484 | 8/1995 | Shikawa | 359/716 |
| 5,519,537 | 5/1996 | Shikama | 359/649 |

FOREIGN PATENT DOCUMENTS

| Hei 5-45582(A) | 2/1993 | Japan . |
| Hei 5-203871(A) | 8/1993 | Japan . |
| Hei 6-82690(A) | 3/1994 | Japan . |
| Hei 6-148518(A) | 5/1994 | Japan . |
| Hei 7-92385(A) | 4/1995 | Japan . |
| Hei 7-253535(A) | 10/1995 | Japan . |

OTHER PUBLICATIONS

English–language abstract of Hei 5–45582(A).
English–language abstract of Hei. 5–203871(A).
English–language abstract of Hei. 6–82690(A).
English–language abstract of Hei. 6–148518(A).
English–language abstract of Hei. 7–92385(A).
English–language abstract of Hei. 7–253535(A).

*Primary Examiner*—Georgia Y. Epps
*Assistant Examiner*—Jordan M. Schwartz
*Attorney, Agent, or Firm*—Oliff & Berridge, PLC

[57] ABSTRACT

A projection lens system has a wide angle with small value for back focus, superior telecentric characteristics, and small distortion. The projection lens system includes a first lens group having a negative refractive power and a second lens group having a positive refractive power. The focal length of the entire system, the focal length of the first lens group and the focal length of the second lens group satisfy conditional formulas.

19 Claims, 12 Drawing Sheets

NA = 0.13

0.500
SPHERICAL
ABERRATION
SINE CONDITION

Y = 18.30

0.500
ASTIGMATISM

Y = 18.30

2.000
DISTORTION

FNO = 3.89

0.500

SPHERICAL
ABERRATION
SINE CONDITION

Y = 18.30

0.500

ASTIGMATISM

Y = 18.30

2.000

DISTORTION

NA = 0.14

0.500
SPHERICAL
ABERRATION
SINE CONDITION

Y = 18.30

0.500
ASTIGMATISM

Y = 18.30

2.000
DISTORTION

NA = 0.14

0.500
SPHERICAL
ABERRATION
SINE CONDITION

Y = 17.00

0.500
ASTIGMATISM

Y = 17.00

3.000
DISTORTION

FIGURE 11A
NA = 0.14
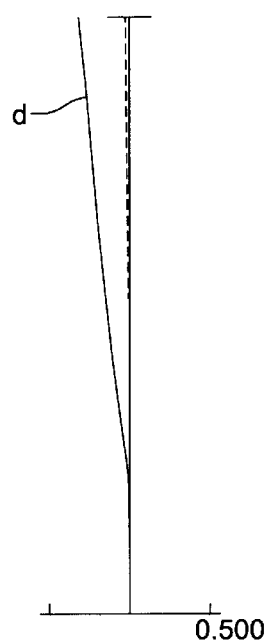
0.500
SPHERICAL
ABERRATION
SINE CONDITION
FIGURE 11B
Y = 17.00
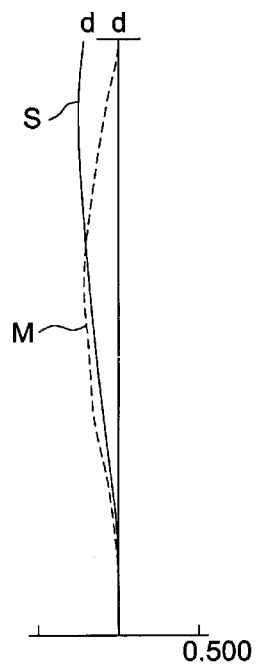
0.500
ASTIGMATISM
FIGURE 11C
Y = 17.00
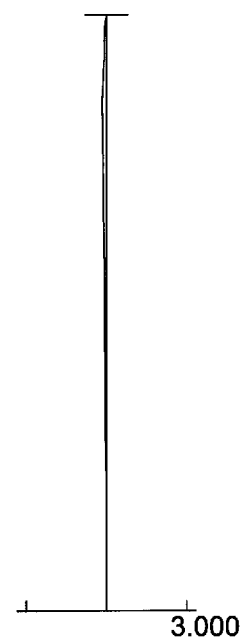
3.000
DISTORTION
FIGURE 11

PROJECTION LENS SYSTEM

BACKGROUND OF THE INVENTION

1. Field of the Invention

The present invention relates to a projection lens system to be used for a projection apparatus which magnifies and projects an image from a device such as a liquid crystal display (LCD) panel onto a screen.

2. Description of Related Art

An apparatus which projects an image from a high-illumination CRT on a screen by means of a projection lens system is known. However, in recent years, an apparatus has been developed in which an image on a liquid crystal display, instead of CRT, is magnified and projected using a projection lens system.

A projection apparatus using a LCD panel is illustrated in FIG. 12. In FIG. 12, a source light ray emitted from the light source 100 is color separated by a dichroic mirror 101 which reflects red light rays (R-rays) to separate the source light ray into R-rays and light rays other than R-rays. The reflected R-rays are reflected by a mirror 110, and then they enter a transmission type R-ray LCD panel 120. The light ray transmitted through the mirror 101 is color separated by a second dichroic mirror 102, which reflects blue light rays (B-rays), to separate B-rays and green rays (G-rays). The B-rays reflected by the mirror 102 enter a B-ray LCD panel 121. The G-rays transmitted through the mirror 102 enter the G-ray LCD panel 122. The light rays entering each color ray LCD panel are modulated by the color signal of the respective colors in each LCD panel, and only the modulated projection light is transmitted. The R-rays and B-rays emitted from the R-ray LCD panel 120 and the B-ray LCD panel 121 are synthesized by a B-ray reflecting dichroic mirror 103. The synthesized light is then synthesized a second time with the G-rays emitted from the G-ray LCD panel 122 and reflected by a G-ray reflecting dichroic mirror 104 to become a projection light. The projection light is projected by a projection lens system 130 onto a screen.

A projection apparatus using the above-mentioned LCD panels, unlike a projection apparatus using a CRT, is not capable of electrically correcting distortion of the pictures in the projection image. Moreover, only light rays emitted at a substantially vertical angle with respect to the LCD panel may be used due to the angle characteristic dependency of the liquid crystal.

Due to the problems mentioned above, the projection lens system for a projection apparatus using LCD panels must have small distortion and excellent telecentric properties in the LCD panel side.

A retrofocus type lens system having a front group of lenses with a negative refractive power and a rear group of lenses with a positive refractive power is conventionally known to project an image from the above-mentioned LCD panels.

However, a retrofocus type lens system tends to produce off-axis aberrations such as distortion, astigmatism and chromatic aberration of magnification. Correction of these off-axis aberrations is difficult when the F-number for the retrofocus type lens is small.

When telecentric characteristics are provided in the retrofocus type lens system to make the off-axis main light ray parallel to the optical axis, the value for the back focus becomes too large, causing the projection apparatus itself to be very large. Hence, in order to produce a compact projection apparatus, it is necessary to limit the back focus value within a certain range.

The LCD panels are typically driven by a matrix electrode. Therefore, electrical correction of distortion of the projection image is difficult. Thus, the distortion of the projection image is mainly controlled by the construction of the projection lens system.

The above problems have prevented the use of a wide angle projection lens system to project images from LCD panels.

SUMMARY OF THE INVENTION

An object of the present invention is to provide a compact, wide angle projection lens system, having: a retrofocus type lens as a basic structure, a small back focus value, excellent telecentric characteristics, and small distortion.

According to a first aspect of the invention, in order to achieve the above-mentioned object, the projection lens system of the present invention comprises a first lens group having a negative refractive power and a second lens group having a positive refractive power. The focal length of the entire system (f), the focal length of the first lens group (f1) and the focal length of the second lens group (f2) satisfy the following conditional formulas:

$$1 < |f1|/f < 4 \tag{1}$$

$$0.5 < |f1|/|f2| < 3 \tag{2}$$

BRIEF DESCRIPTION OF THE DRAWINGS

A description of preferred embodiments of the invention will be provided in conjunction with the following drawing figures, wherein:

FIG. 11 shows aberration diagrams for the projection lens system of the fifth embodiment of the present invention.

DETAILED DESCRIPTION OF PREFERRED EMBODIMENTS

Embodiments of the present invention are described hereafter based on the drawings. At the outset, the present invention will be described with regard to the functional relationship between the structure of the invention and the focal lengths of the various lens groups.

Figure 1:
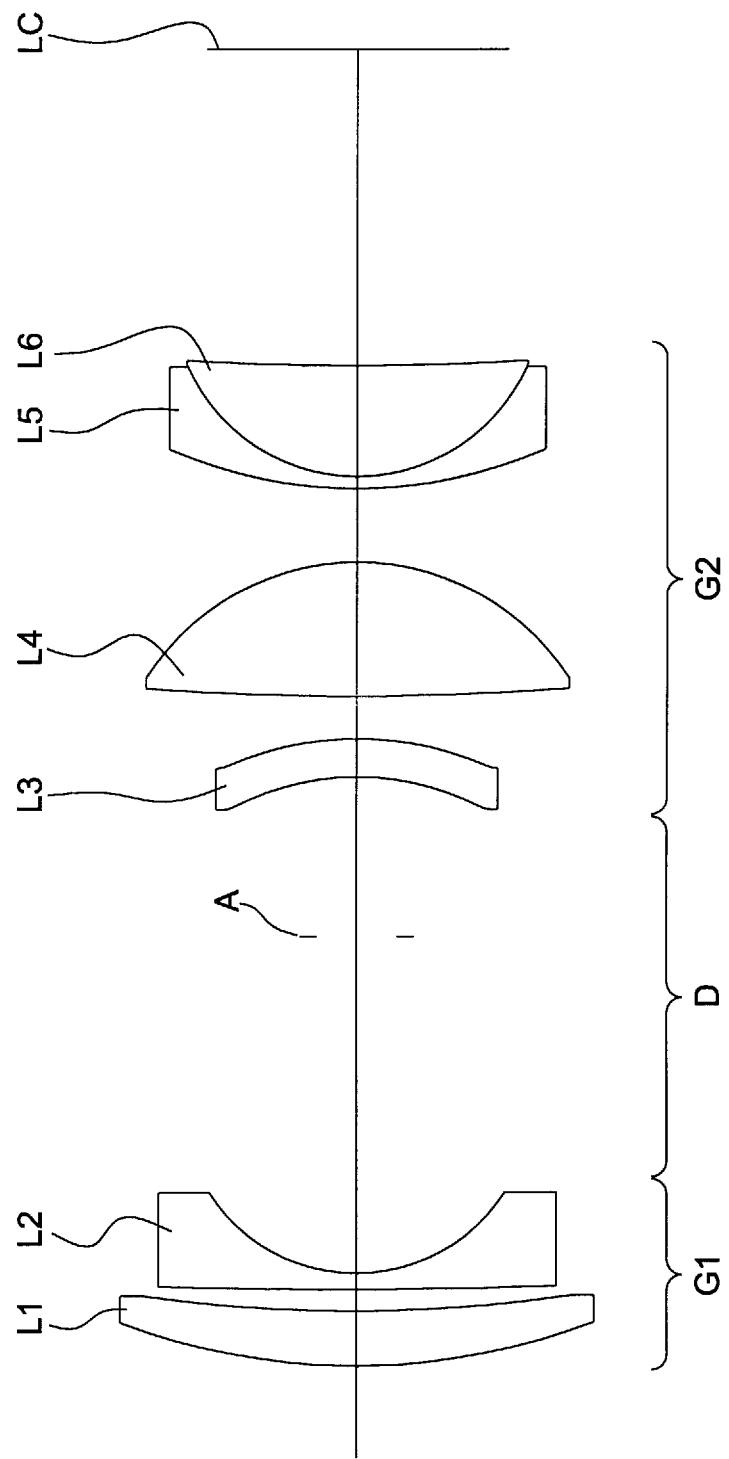
FIG. 1 is a cross section of a projection lens system of first embodiment of the present invention.

FIG. 1 is a cross section of a projection lens system of a first embodiment of the present invention. In FIG. 1, the projection lens system comprises, in the following order from a screen side of the system: a first lens group G1 having a negative refractive power, an aperture diaphragm A, and a second lens group G2 having a positive refractive power. The lens system projects, with a predetermined magnification, an image displayed on an image forming plane LC of a LCD panel.

In the projection lens system of the present invention, the focal length of the entire system f, the focal length of the first lens group f1 and the focal length of the second lens group f2 satisfy the following conditional formulas (1) and (2):

$$1 < |f1|/f < 4 \quad (1)$$

$$0.5 < |f1|/|f2| < 3 \quad (2)$$

If the value of $|f1|/f$ is larger than the upper limit of conditional formula (1) above, the refractive power of the first lens group G1 becomes undesirably weak, causing the size of the first lens group G1 to be too large.

On the other hand, if the value of $|f1|/f$ is smaller than the lower limit value of conditional formula (1), the refractive power of the first lens group G1 becomes too strong, causing barrel distortion of the projection lens system to be too large, and making correction of distortion difficult. Moreover, if the value of $|f1|/f$ is smaller than the lower limit value of conditional formula (1), the back focus is unnecessarily long, causing the size of the projection lens system itself to be too large.

If the value of $|f1|/|f2|$ is larger than the upper limit value of conditional formula (2), it is necessary to increase the distance between the first lens group G1 and the second lens group G2 to correct image plane distortion. In such a case, the first lens group G1 must be made large, resulting in the problem of the entire lens system being too large.

On the other hand, if the value of $|f1|/|f2|$ of the projection lens system is smaller than the lower limit value of conditional formula (2), the barrel distortion and the spherical aberration are negatively large and correction is undesirably difficult.

Moreover, in the present invention, the distance D between the first lens group G1 and the second lens group G2 and the focal length of the first lens group f1 preferably satisfy the following conditional formula:

$$0.7 < D/|f1| < 1.6 \quad (3)$$

If the value of $D/|f1|$ is larger than the upper limit value of conditional formula (3), correction of a chromatic aberration of magnification is easy but the size of the first lens group is undesirably large.

On the other hand, if the value of $D/|f1|$ is smaller than the lower limit value of conditional formula (3), the size of the first lens group G1 is small, but correction of distortion and correction of chromatic aberration of magnification is undesirably difficult. In order to correct distortion here, the system must be formed in such a manner that the shape of the aspherical surface in the first lens group G1 possesses an inflection point, which makes the manufacturing process undesirably difficult.

In order to produce a favorable balance between correction of on-axis chromatic aberration and correction of the chromatic aberration of magnification, the second lens group G2 preferably contains a cemented lens.

Furthermore, in the present invention, the first lens group G1 preferably comprises, in the following order from the screen side: an aspherical positive lens L1 and a negative lens L2, as shown in FIG. 1. The aspherical lens L1 is preferably made of resin. In the above configuration, the focal length f1 of the first lens group G1 and the focal length f12 of the negative lens L2 in the first lens group G1 preferably satisfy the following conditional formula:

$$0.7 < |f12|/|f1| < 1.2 \quad (4)$$

Conditional formula (4) defines conditions to make the various aberrations and paraxial amount difficult to vary even if the shape of the aspherical lens made of resin used in the first lens group G1 changes due to temperature fluctuation. If the value of $|f12|/|f1|$ of the aspherical lens L1 deviates from the range specified by conditional formula (4), the refractive power of the aspherical lens L1 made of resin is too large, causing fluctuation of various aberrations and paraxial amounts. In particular, movement of the Gaussian image plane is too large. As a result, when the temperature changes, the focal position moves and a defocus condition occurs.

Moreover, the second lens group G2 preferably comprises, in the following order from the screen side: an aspherical positive lens L3, a positive lens L4, and a cemented lens with a negative meniscus lens L5 and a positive lens L6.

The lenses L5 and L6 are placed in the cemented lens in such a manner that on-axis chromatic aberration and chromatic aberration of magnification are corrected simultaneously. This is accomplished by placing the cemented lens L5, L6 at a position as far away as possible from the diaphragm A, and close to the image forming plane LC, and by making the RAND light ray (on-axis outermost light ray) width large. On-axis chromatic aberration increases with the width of the RAND light ray, and chromatic aberration of magnification increases with the distance of the main light ray from the optical axis.

The aspherical positive lens L3 of the second lens group G2 is preferably made of resin. The focal length f2 of the second lens group G2 and the focal length f22 of the positive lens L4 preferably satisfy the following conditional formula:

$$0.8 < |f22|/|f2| < 2 \quad (5)$$

Conditional formula (5) defines a range in which the fluctuation of various aberrations and the paraxial amount are controlled when the shape of the aspherical lens L3 made of resin changes due to temperature change. If the value of $|f22|/|f2|$ deviates from the range defined in formula (5), the refractive power of the aspherical lens L3 made of resin is too large, causing fluctuation of various aberrations and the paraxial amount. In particular, the movement of the Gaussian image plane is large. Hence, the focal position moves with the fluctuation of the temperature and a defocus condition occurs.

The cemented lens L5, L6 is preferably structured to satisfy the following conditional formula:

$$2 < |f23|/f22 \quad (6)$$

where f22 is a focal length of the positive lens L4 and f23 is a focal length of the cemented lens L5, L6 in the second lens group G2.

If the value of $|f23|/f22$ is smaller than the lower limit value of conditional formula (6), the refractive power of the cemented lens L5, L6 is large. Accordingly, the refractive power of the positive lens L4 is relatively small, making it impossible to correct bow in the best image plane, which is undesirable.

In a projection lens system configured to satisfy the above-mentioned conditional formulas (1) and (2), it is preferred for the second lens group G2 to comprise at least two cemented lenses with opposite signs for the radius of curvature of the cemented surfaces.

When two cemented lenses are configured such that the cemented surfaces face opposite from each other, each lens is able to contribute to the correction of on-axis chromatic aberration, while keeping the radius of curvature of the cemented lenses small. One advantage to such a configuration for the cemented lenses is that they will be able to reduce chromatic aberration to a higher degree. Moreover, because the cemented surfaces are facing in opposite directions, the direction of chromatic aberration produced by these cemented surfaces is opposite from each other. Hence, the chromatic aberration of the cemented surfaces of the two cemented lenses offset each other, reducing chromatic coma to a negligible level.

A projection apparatus using a projection lens system of the first embodiment of the present invention will be described hereafter with reference to FIG. 2.

Figure 2:
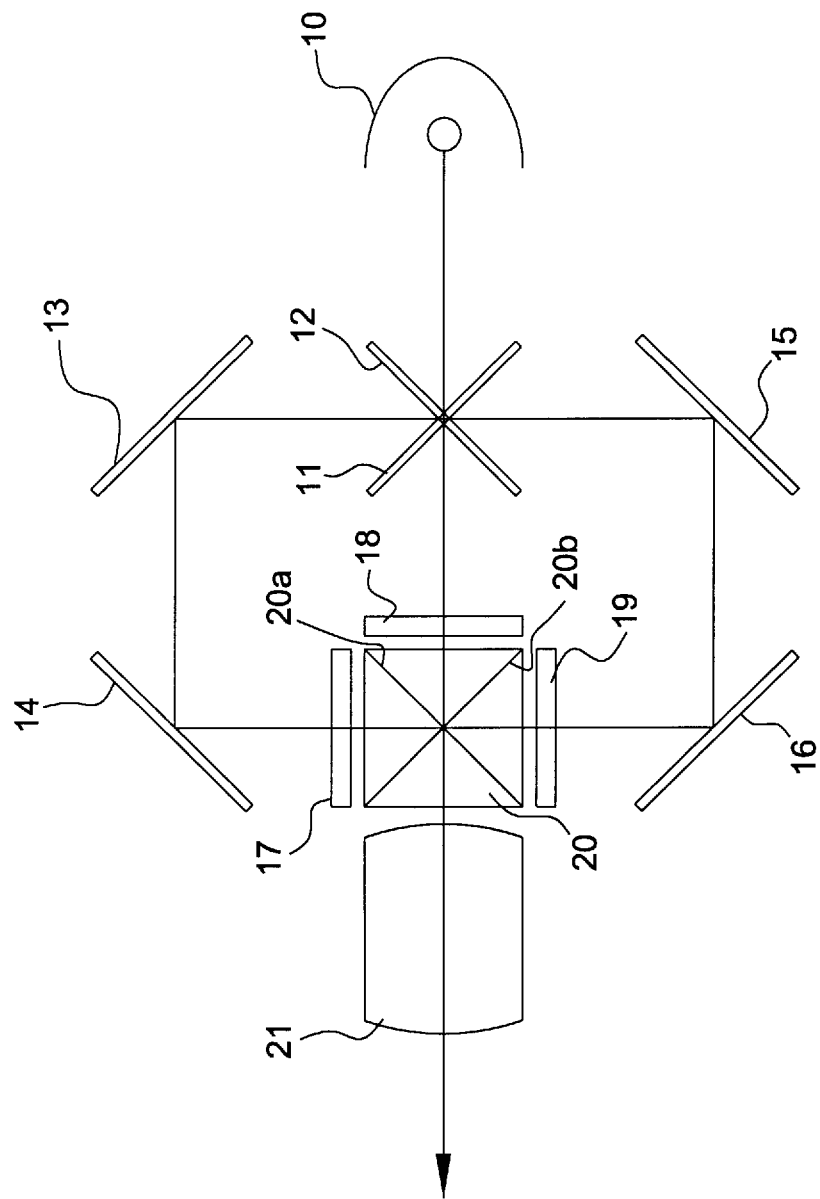
FIG. 2 is a schematic view of a projection apparatus according to the present invention.

In FIG. 2, a white light ray emitted from a light source 10 contacts a cross dichroic mirror comprising a R-ray reflecting dichroic mirror 11 and a B-ray reflecting dichroic mirror 12 placed perpendicular to each other. The white light ray is color separated by the cross dichroic mirror 11, 12 into R, G, and B-rays. The R-rays enter the R-ray transmission type LCD panel 17 after being reflected by the R-ray reflecting dichroic mirror 11 of the cross dichroic mirror 11, 12 and being reflected by the mirrors 13 and 14. The B-ray enters the B-ray transmission type LCD panel 19 after being reflected by the B-ray reflecting dichroic mirror 12 of the cross dichroic mirror 11, 12 and being reflected by the mirrors 15 and 16. The G-rays transmit through the cross dichroic mirror 11, 12 and directly enter the G-ray transmission type LCD panel 18.

Each color ray LCD panel 17–19 displays image information. Light rays transmitted from each of the color ray LCD panels 17–19 are modulated according to the image information.

A cross dichroic prism 20, having R-ray reflecting dichroic film 20a and B-ray reflecting dichroic film 20b placed perpendicular to each other, is placed on the transmission side of each color ray LCD panels 17–19. The R-ray signal, which is the emitted R-ray modulated by the R-ray transmission LCD panel 17, is reflected by the R-ray reflecting dichroic film 20a and moves towards the projection lens system 21. The B-ray signal, which is the emitted B-ray modulated by the B-ray transmission LCD panel 19, is reflected by the B-ray reflecting dichroic film 20b and moves towards the projection lens system 21. The G-ray signal, which is the emitted G-ray modulated by the G-ray transmission LCD panel 18, transmits through the cross dichroic prism 20 and moves towards the projection lens system 21. Each light signal from the cross dichroic prism 20 is projected by the projection lens system 21 onto a screen (not shown), and a composite image of the images displayed on each of light ray transmission type LCD panels 17–19 is formed on the screen.

Figure 3:
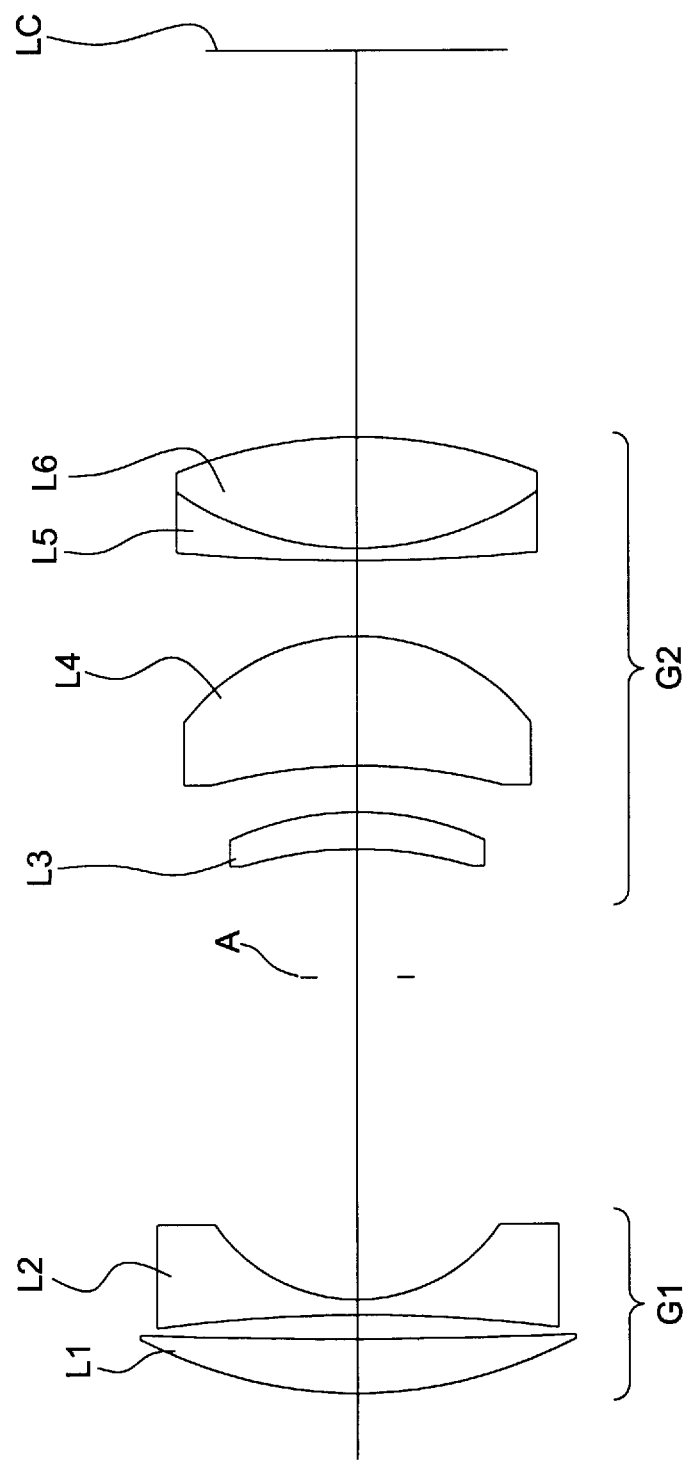
FIG. 3 is a cross section of a projection lens system of a second embodiment of the present invention.
Figure 4:
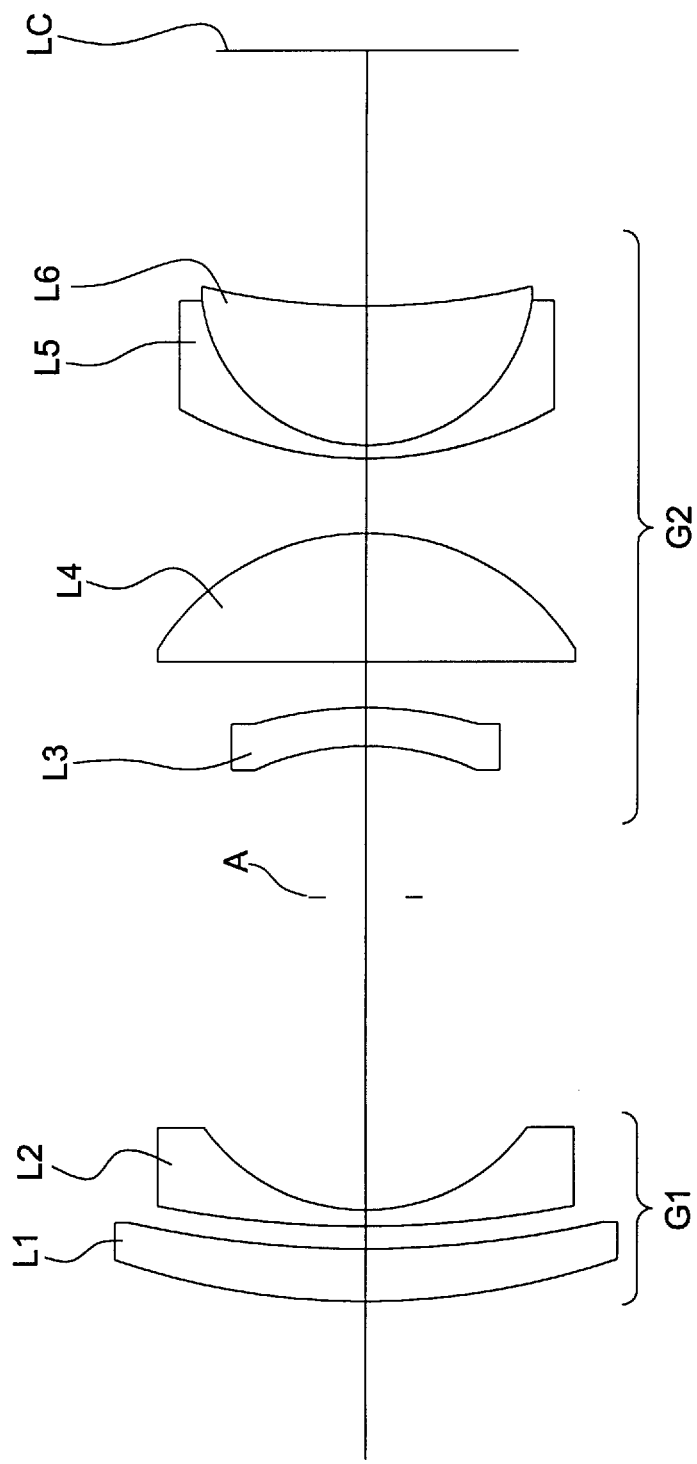
FIG. 4 is a cross section of a projection lens system of a third embodiment of the present invention.

Next, embodiments of the projection lens system of the present invention will be described. FIG. 1 is a cross section of a projection lens system according to a first embodiment of the present invention, FIG. 3 is a cross section of a projection lens system according to a second embodiment of the present invention, FIG. 4 is a cross section of a projection lens system according to a third embodiment of the present invention, FIG. 5 is a cross section of a projection lens system according to a fourth embodiment of the present invention, and FIG. 6 is a cross section of a projection lens system according to a fifth embodiment of the present invention.

The projection lens system in the first, second and third embodiments comprises, in the following order from the screen side: a first lens group G1 with a negative refractive power, an aperture diaphragm A, and a second lens group G2 with a positive refractive power. The projection lens system projects an image displayed on an image forming plane LC of a LCD system onto a screen with predetermined magnification. The first lens group G1 comprises, in the following order from the screen side: an aspherical positive lens L1 and a negative lens L2. The second lens group G2 comprises, in the following order from the screen side: an aspherical positive lens L3 having a meniscus shape with a concave surface facing the screen side, a positive lens L4 having a surface with large curvature on the image forming plane LC side, and a cemented lens L5, L6 having a negative meniscus lens L5 with a convex surface facing the screen side and a positive lens L6 having a convex surface with large curvature on the screen side.

Figure 5:
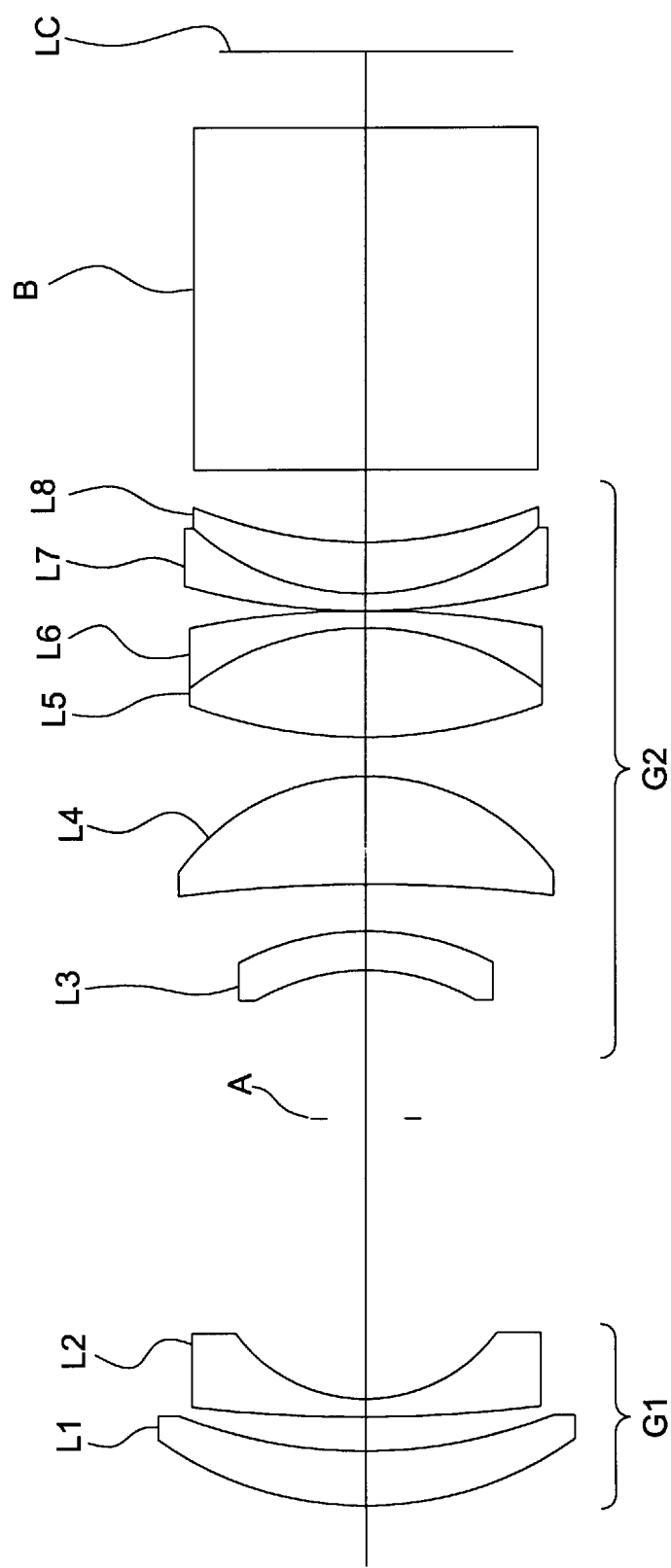
FIG. 5 is a cross section of a projection lens system of a fourth embodiment of the present invention.

The projection lens system in the fourth embodiment, as shown in FIG. 5, comprises, in the following order from the screen side: a lens group G1 having a negative refractive power, an aperture diaphragm A, and a second lens group G2 having a positive refractive power. The projection lens system in the fourth embodiment projects an image from the image forming plane LC of a LCD system onto a screen with predetermined magnification. The first lens group comprises, in the following order from the screen side: an aspherical lens L1 and a negative lens L2. The second lens group comprises, in the following order from the screen side: an aspherical lens L3 having a meniscus shape with a concave surface facing the screen side, a positive lens L4 having a convex surface with strong curvature on the image forming plane LC side, a cemented lens L5, L6 having a positive double convex lens L5 with strong curvature on the LC side and a meniscus shape negative lens L6 with a concave surface facing the screen side, and a cemented lens L7, L8 having a meniscus shaped negative lens L7 with, a concave surface facing the LC side and a positive meniscus shaped lens L8 having a convex surface with a strong curvature on the screen side.

Figure 6:
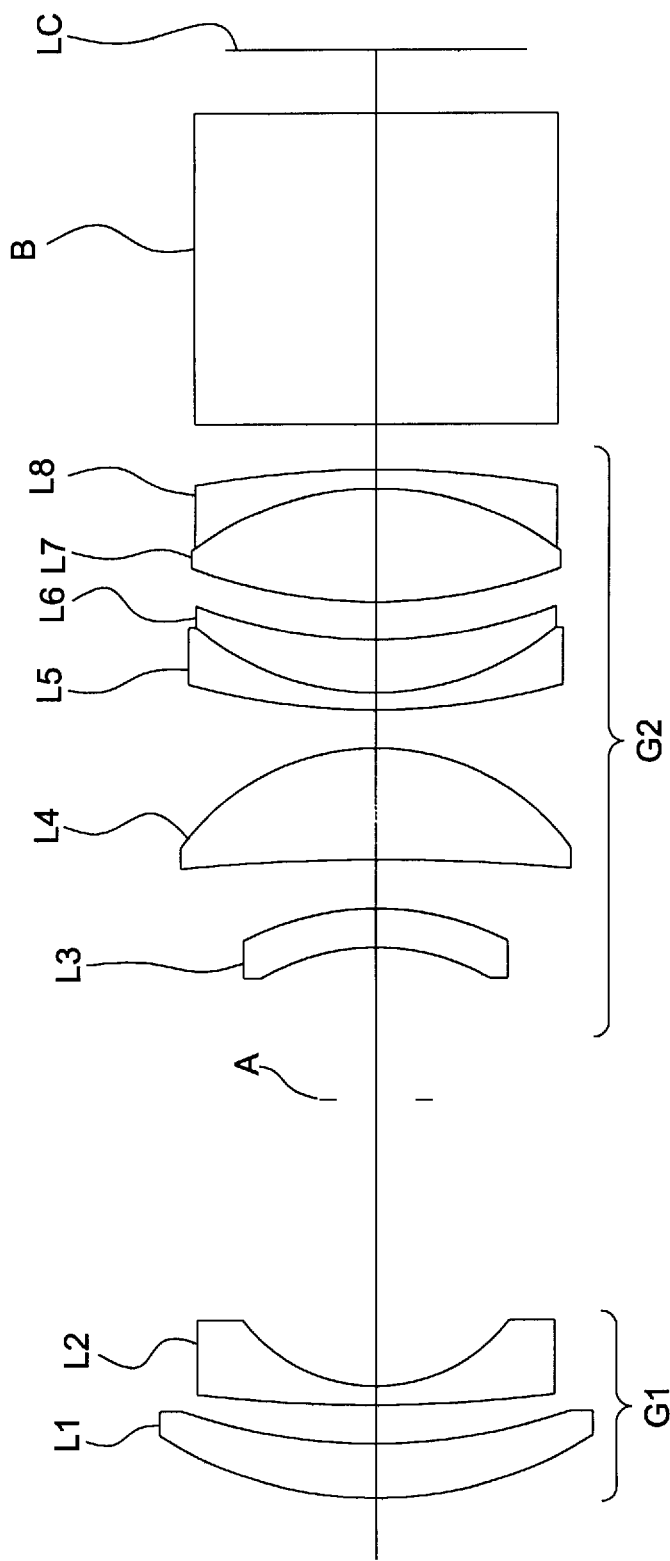
FIG. 6 is a cross section of a projection lens system of a fifth embodiment of the present invention.

The projection lens system in the fifth embodiments as shown in FIG. 6, comprises, in the following order from the screen side: a first lens group G1 having a negative refractive power, an aperture diaphragm A, and a second lens group G2 having a positive refractive power. The projection lens system in the fifth embodiment projects an image displayed on an image forming plane LC of a LCD system onto a screen with predetermined magnification. The first lens group comprises, in the following order from the screen side: an aspherical lens L1 and a negative lens L2. The second lens group comprises, in the following order from the screen side: an aspherical lens L3 having a meniscus shape with a concave surface facing the screen side, a positive lens L4 having a convex surface with strong curvature on the image forming plane LC side, a cemented lens L5, L6 having a meniscus shape negative lens L5 with the concave surface on the LC side and a meniscus shaped positive lens L6 with a convex surface facing the screen side, and a cemented lens L7, L8 having a double convex positive lens L7 with a strong curvature on the LC side and a meniscus shaped negative lens L8 with a concave surface facing the screen side.

In each of the embodiments, an aspherical lens made of acrylic is used for both the aspherical positive lens L1 in the first lens group G1 and for the aspherical positive lens L3 in the second lens group G2. The aspherical positive lens L1 in the first lens group G1 mainly corrects distortion and lowers coma aberration. The aspherical positive lens L3 of the second lens group G2 mainly corrects spherical aberration and upper coma aberration. In each of the embodiments, aspherical lenses L1 and L3 are made of acrylic resin having little refracting power to avoid movement of the focal point caused by volume change, shape change, and change in the refraction index of the acrylic resin due to heat and fluctuation of temperature. A slight positive refracting power is retained to correct focal point movement due to heat and temperature.

First Embodiment

In FIG. 1, the projection lens system of the first embodiment comprises, in the following order from the screen side: a first lens group G1 having a negative refractive power, a diaphragm A to regulate the light ray which determines F-value and off-axis light rays, and a second lens group G2 having a positive refractive power. The first lens group G1 comprises, in the following order from the screen side: an aspherical positive lens L1 having a meniscus shape with a convex surface facing the screen side and a negative meniscus lens L2 having a convex surface facing the screen side. The second lens group G2 comprises, in the following order from the screen side: an aspherical positive lens L3 having a meniscus shape with the concave surface facing the screen sidle wherein both surfaces have an aspherical shape, a positive lens L4 having a biconvex shape with a strong convex surface facing the image display surface LC side, and a cemented lens L5, L6 having a negative meniscus lens L5 with the convex surface facing the screen side, and a positive meniscus lens L6 with the convex surface facing the screen side, and a convex contact surface on the screen side.

In each of Tables 1–5, f is the focal length of the entire projection lens system, F is the F-number, $2\omega$ is a total field angle, and do is a distance from the screen to the first lens surface. Moreover, in Tables 1–5, rj is the j-th radius of curvature, dj is the distance from the j-th lens surface to the subsequent lens surface, ni is the index of refraction of the d-line in the i-th lens, and vi is the Abbe's number of the i-th lens. Furthermore, aspherical lens surfaces are denoted by * attached on the left of rj. The aspherical surface shape is expressed by the equation (7) below.

$$X = CS^2(1 + (1 - KC^2S^2)^{1/2})^{-1} + \sum_{i=1}^{S} C2iS^{2i} \quad (7)$$

Here, S is height from the optical axis, X is the amount of sag at lens surface height S, K is a conical constant, C is a curvature of the reference spherical surface, and $C2i$ (i=1, 5) is an aspherical surface coefficient of degree 2i. In each of Tables 1–5, "x10-N" means the Nth power of ten.

Various dimensions of the first embodiment are listed in Table 1.

TABLE 1

| f = 22.82 | F/3.71 | $2\omega$ = 77.6 | d0 = 847.0 |
|---|---|---|---|
| *r1 = 96.6983 | d1 = 7.0000 | n1 = 1.49108 | v1 = 57.57 |
| *r2 = 98.0000 | d2 = 3.0000 | | |
| r3 = 414.2800 | d3 = 2.0000 | n2 = 1.51680 | v2 = 64.2 |
| r4 = 23.7400 | d4 = 65.0000 | | |
| *r5 = 32.9281 | d5 = 5.0000 | n3 = 1.49108 | v3 = 57.57 |
| *r6 = −30.0000 | d6 = 6.0000 | | |
| r7 = 509.6900 | d7 = 17.0000 | n4 = 1.61272 | v4 = 58.58 |
| r8 = −33.0000 | d8 = 10.0000 | | |
| r9 = 64.8470 | d9 = 1.5000 | n5 = 1.84666 | v5 = 23.78 |
| r10 = 24.2000 | d10 = 14.5000 | n6 = 1.61272 | v6 = 58.58 |
| r11 = 380.0000 | d11 = 41.3018 | | |

Aspherical Surface Coefficients:
L1
1st Surface K = 1.0   C2 = 0.0   C4 = 1.81510 × 10 −6
C6 = −9.36640 × 10 −10   C8 = 4.47650 × 10−14   C10 = 0.0
2nd Surface K = 1.0   C2 = 0.0   C4 = −2.79930 × 10−6
C6 = −9.43030 × 10 −10   C8 = 9.02580 × 10−13   C10 = 0.0
L3
5th Surface K = 1.0   C2 = 0.0   C4 = −3.96290 × 10−6
C6 = −4.61340 × 10−8   C8 = 2.30640 × 10−10   C10 = 0.0
6th Svrface K = 1.0   C2 = 0.0   C4 = 7.58190 × 10−6
C6 = −1.07700 × 10−8   C8 = 1.59400 × 10−10   C10 = 0.0

Conditional Values for the First Embodiment:

|f1/f|=2.20

|f1/f2|=1.22

D/|f1|=1.29

|f12/f1|=0.97

|f22/f2|=1.23

|f23/f22|=10.03

Second Embodiment

In FIG. 3, the projection lens system of the second embodiment comprises, in the following order from the screen side: a first lens group G1 having a negative refractive power, a diaphragm A to regulate the light ray which determines F-value and off-axis light rays, and a second lens group G2 having a positive refractive power.

As shown in FIG. 3, the first lens group G1 comprises, in the following order from the screen side: an aspherical positive lens L1 having a meniscus shape with the convex surface facing the screen side and with the concave surface having an aspherical shape, and a negative lens L2 having a biconcave shape with a strong concave surface facing the image display surface LC side. The second lens group G2 comprises, in the following order from the screen side: an aspherical positive lens L3 having a meniscus shape with a concave surface facing the screen side wherein both surfaces have an aspherical shape, a positive lens L4 having a meniscus shape with strong convex surface facing the image display surface LC side, and a cemented lens L5, L6 having a negative meniscus lens L5 with the convex surface facing the screen side, a positive lens L6 having a biconvex shape, and a convex contact surface on the screen side.

Various dimensions of the second embodiment are listed in Table 2.

TABLE 2

| f = 22.93 | F/3.89 | 2ω = 78.1 | d0 = 847.0 |
|---|---|---|---|
| *r1 = 96.6983 | d1 = 7.0000 | n1 = 1.49108 | ν1 = 57.57 |
| *r2 = 200.0000 | d2 = 3.0000 | | |
| r3 = −246.8121 | d3 = 2.0000 | n2 = 1.51680 | ν2 = 64.1 |
| r4 = 22.1791 | d4 = 59.2000 | | |
| *r5 = −50.0000 | d5 = 5.0000 | n3 = 1.49108 | ν3 = 57.57 |
| *r6 = −30.0000 | d6 = 6.0000 | | |
| r7 = −69.5787 | d7 = 17.0000 | n4 = 1.61272 | ν4 = 58.54 |
| r8 = −38.7530 | d8 = 10.0000 | | |
| r9 = 288.4649 | d9 = 1.5000 | n5 = 1.84666 | ν5 = 23.82 |
| r10 = 37.1886 | d10 = 14.5000 | n6 = 1.61272 | ν6 = 58.54 |
| r11 = −66.7328 | d11 = 49.9098 | | |

Aspherical Surface Coefficients:
L1
1st Surface K = 1.0  C2 = 0.0  C4 = 4.48680 × 10−6
C6 = −1.54487 × 10−10  C8 = 9.73053 × 10−13  C10 = 0.0
2nd Surface K = 1.0  C2 = 0.0  C4 = −1.07038 × 10−6
C6 = −1.32558 × 10−9  C8 = 6.92432 × 10−13  C10 = 0.0
L3
5th Surface K = 1.0  C2 = 0.0  C4 = −1.98490 × 10−6
C6 = 2.90394 × 10−8  C8 = −4.26439 × 10−10  C10 = 0.0
6th Surface K = 1.0  C2 = 0.0  C4 = 1.81253 × 10−5
C6 = 3.10300 × 10−8  C8 = −1.45745 × 10−10  C10 = 0.0

Conditional Values for the Second Embodiment:

$|f1/f|=2.01$ $|f1/f2|=1.05$ $D/|f1|=1.30$ $|f12/f1|=0.86$ $|f22/f2|=1.59$ $|f23/f22|=2.38$

Third Embodiment

In FIG. 4, the projection lens system of the third embodiment comprises, similar to the first embodiment above, in the following order from the screen side: a first lens group G1 having a negative refractive power, a diaphragm A to regulate the light ray which determines F-value and off-axis light rays, and a second lens group G2 having a positive refractive power.

As shown in FIG. 4, the first lens group G1 comprises, in the following order from the screen side: an aspherical positive lens L1 having a meniscus shape with the convex surface facing the screen side and both surfaces having an aspherical shape, and a negative lens L2 having a meniscus shape with a convex surface facing the screen side. The second lens group G2 comprises, in the following order from the screen side: an aspherical positive lens L3 having a meniscus shape with a concave surface facing the screen side wherein both surfaces have an aspherical shape, a positive lens L4 having a biconvex shape with strong convex surface facing the image display surface LC side, and a cemented lens L5, L6 having a negative meniscus lens L5 with the convex surface facing the screen side, and a positive meniscus lens L6 with a convex contact surface on the screen side.

Various dimensions of the third embodiment are listed in Table 3.

TABLE 3

| f = 22.93 | F/3.71 | 2ω = 77.4 | d0 = 847.0 |
|---|---|---|---|
| *r1 = 120.0000 | d1 = 7.0000 | n1 = 1.49108 | ν1 = 57.57 |
| *r2 = 95.0000 | d2 = 3.0000 | | |
| r3 = 128.0936 | d3 = 2.0000 | n2 = 1.46450 | ν2 = 65.77 |
| r4 = 25.0438 | d4 = 61.0000 | | |
| *r5 = −30.0000 | d5 = 5.0000 | n3 = 1.49108 | ν3 = 57.57 |
| *r6 = −35.0000 | d6 = 6.0000 | | |
| r7 = 2958.7019 | d7 = 17.0000 | n4 = 1.69680 | ν4 = 55.60 |
| r8 = −31.7573 | d8 = 10.0000 | | |
| r9 = 48.9228 | d9 = 1.5000 | n5 = 1.860741 | ν5 = 23.01 |
| r10 = 21.5651 | d10 = 18.0000 | n6 = 1.696800 | ν6 = 55.60 |
| r11 = 82.2723 | d11 = 32.2606 | | |

Aspherical Surface Coefficients:
L1
1st Surface K = 1.0  C2 = 0.0  C4 = 1.7248 × 10−6
C6 = −9.84819 × 10−10  C8 = 6.85046 × 10−13  C10 = 0.0
2nd Surface K = 1.0  C2 = 0.0  C4 = −2.21633 × 10−6
C6 = −7.99371 × 10−11  C8 = 6.54207 × 10−13  C10 = 0.0
L3
5th Surface K = 1.0  C2 = 0.0  C4 = 1.34920 × 10−5
C6 = −6.87413 × 10−8  C8 = 2.29989 × 10−10  C10 = 0.0
6th Surface K = 1.0  C2 = 0.0  C4 = 2.23589 × 10−5
C6 = 2.07873 × 10−9  C8 = 7.51985 × 10−11  C10 = 0.0

Conditional Values for the Third Embodiment:

|f1/f|=2.01
|f1/f2|=1.73
D/|f1|=0.95
|f12/f1|=1.05
|f22/f2|=1.22
|f23/f22|=8.33 screen side. In FIG. 5, a glass parallel flat board B, which is equivalent to a color combination dichroic prism, is shown located on the image display surface LC side of the second lens group G2.

Various dimensions of the fourth embodiment are listed in Table 4.

TABLE 4

| f = 22.93 | F/3.59 | 2ω = 72.1 | d0 = 225.9 |
|---|---|---|---|
| *r1 = 97.6100 | d1 = 7.0000 | n1 = 1.49084 | ν1 = 57.07 |
| *r2 = 98.0000 | d2 = 5.0000 | | |
| r3 = 128.0790 | d3 = 2.0000 | n2 = 1.51633 | ν2 = 64.14 |
| r4 = 20.3500 | d4 = 58.0000 | | |
| *r5 = −32.9281 | d5 = 5.0000 | n3 = 1.49084 | ν3 = 57.07 |
| *r6 = −30.0000 | d6 = 6.0000 | | |
| r7 = −471.0000 | d7 = 15.0000 | n4 = 1.612713 | ν4 = 58.75 |
| r8 = −30.5900 | d8 = 7.0000 | | |
| r9 = 374.0530 | d9 = 12.0000 | n5 = 1.612713 | νS = 58.75 |
| r10 = −35.0800 | d10 = 2.0000 | n6 = 1.755203 | ν6 = 27.51 |
| r11 = −208.9400 | d11 = 0.2000 | | |
| r12 = 73.9000 | d12 = 2.0000 | n7 = 1.755203 | ν7 = 27.51 |
| r13 = 35.0800 | d13 = 8.5000 | n8 = 1.612713 | ν8 = 58.75 |
| r14 = 173.6600 | d14 = 6.0922 | | |
| r15 = 0.0000 | d15 = 41.61 | n9 = 1.620046 | ν9 = 36.30 |
| r16 = 0.0000 | d16 = 9.9496 | | |

Aspherical Surface Coefficients:
L1
1st Surface K = 1.0        C2 = 0.0               C4 = 7.32880 × 10−6
C6 = −2.91730 × 10−9       C8 = 2.28860 × 10−12   C10 = 0.0
2nd Surface K = 1.0        C2 = 0.0               C4 = 4.62870 × 10−6
C6 = −4.12870 × 10−9       C8 = 9.29860 × 10−13   C10 = 0.0
L3
Sth Surface K = 1.0        C2 = 0.0               C4 = −5.64200 × 10−6
C6 = −1.92040 × 10−8       C8 = 8.94830 × 10−11   C10 = 0.0
6th Surface K = 1.0        C2 = 0.0               C4 = 6.49150 × 10−6
C6 = 9.57310 × 10−9        C8 = 8.69190 × 10−11   C10 = 0.0

Fourth Embodiment

In FIG. 5, the projection lens system of the fourth embodiment comprises, in the following order from the screen side: a first lens group G1 having a negative refractive power, a diaphragm A to regulate the light ray which determines F-value and off-axis light rays, and a second lens group G2 having a positive refractive power.

As shown in FIG. 5, the first lens group G1 comprises, in the following order from the screen side: an aspherical positive lens L1 having a meniscus shape with a convex surface facing the screen side and both surfaces being aspherical in shape, and a negative meniscus lens L2 having the convex surface facing the screen side. The second lens group G2 comprises, in the following order from the screen side: an aspherical positive lens L3 having a meniscus shape with the concave surface facing the screen side wherein both surfaces are aspherical in shape, a positive lens L4 with a strong convex surface facing the image display surface LC side, a cemented lens L5, L6 having a biconvex shape positive lens L5 with the convex surface with stronger curvature facing the image display surface LC side and a negative meniscus lens L6 with the concave surface facing the screen side, and a cemented lens L7, L8 having a negative meniscus lens L7 with the concave surface facing the image display surface LC side, and a meniscus shaped positive lens L8 with the convex contact surface facing the screen side. In FIG. 5, a glass parallel flat board B, which is equivalent to a color combination dichroic prism, is shown located on the image display surface LC side of the second lens group G2.

Conditional Values for the Fourth Embodiment:

|f1/f|=2.14
|f1/f2|=1.23
D/|f1|=1.18
|f12/f1|=0.97
|f22/f2|=1.32

Fifth Embodiment

In FIG. 6, the projection lens system of the fifth embodiment comprises, in the following order from the screen side: a first lens group G1 having a negative refractive power, a diaphragm A to regulate the light ray which determines the F-value and off-axis light rays, and a second lens group G2 having a positive refractive power.

As shown in FIG. 6, the first lens group G1 comprises, in the following order from the screen side: an aspherical positive lens L1 having a meniscus shape with the convex surface facing the screen side and both surfaces being aspherical in shape, and a negative meniscus lens L2 having the convex surface facing the screen side. The second lens group G2 comprises, in the following order from the screen side: an aspherical positive lens L3 having a meniscus shape with the concave surface facing the screen side wherein both surfaces are aspherical in shape; a positive lens L4 with a stronger convex surface facing the image display surface LC side; a cemented lens L5, L6 having a meniscus shape negative lens L5 with the concave surface facing the image display surface LC side, and a positive meniscus lens L6 with the convex contact surface facing the screen side; and a cemented lens L7, L8 having a biconvex shaped positive lens L7 with the stronger convex surface facing the image display surface LC side, and meniscus shaped negative lens L8 with a concave contact surface facing the screen side. In FIG. 6, a glass parallel flat board B, which is equivalent to a color combination dichroic prism, is also shown.

Various dimensions of the fifth embodiment are listed in Table 5.

TABLE 5

| f = 22.93 | F/3.62 | 2ω = 72.3 | d0 = 230.5 |
|---|---|---|---|
| *r1 = 96.6983 | d1 = 7.0000 | n1 = 1.49084 | ν1 = 57.07 |
| *r2 = 98.0000 | d2 = 5.0000 | | |
| r3 = 179.0926 | d3 = 2.0000 | n2 = 1.516799 | ν2 = 64.20 |
| r4 = 21.0544 | d4 = 58.0000 | | |
| *r5 = −32.9281 | d5 = 5.0000 | n3 = 1.49084 | ν3 = 57.07 |
| *r6 = −30.0000 | d6 = 6.0000 | | |
| r7 = −413.4146 | d7 = 15.0000 | n4 = 1.612716 | ')4 = 58.58 |
| r8 = −30.4879 | d8 = 5.0000 | | |
| r9 = 86.3419 | d9 = 2.0000 | n5 = 1.755204 | ν5 = 27.53 |
| r10 = 33.0000 | d10 = 7.0000 | n6 = 1.612716 | ν6 = 58.58 |
| r11 = 51.6689 | d11 = 5.0000 | | |
| r12 = 56.5014 | d12 = 15.0000 | n7 = 1.612716 | ν7 = 58.58 |
| r13 = −37.0000 | d13 = 2.0000 | n8 = 1.755204 | ν8 = 27.53 |
| r14 = −155.2089 | d14 = 6.0000 | | |
| r15 = 0.0000 | d15 = 40.0000 | n9 = 1.620046 | ν9 = 36.30 |
| r16 = 0.0000 | d16 = 9.3004 | | |

Aspherical Surface Coefficients:
L1
| 1st Surface K = 1.0 | C2 = 0.0 | C4 = 8.55340 × 10−6 |
|---|---|---|
| C6 = −4.21230 × 10−9 | C8 = 3.16030 × 10−12 | C10 = 0.0 |
| 2nd Surface K = 1.0 | C2 = 0.0 | C4 = 6.58910 × 10−6 |
| C6 = −7.36740 × 10−9 | C8 = 2.426500×10−12 | C10 = 0.0 |

L3
| 5th Surface K = 1.0 | C2 = 0.0 | C4 = −1.02430 × 10−5 |
|---|---|---|
| C6 = −2.80120 × 10−8 | C8 = 1.13110 × 10−10 | C10 = 0.0 |
| 6th Surface K = 1.0 | C2 = 0.0 | C4 = 4.17350 × 10−6 |
| C6 = 3.76070 × 10−9 | C8 = 1.13480 × 10−10 | C10 = 0.0 |

Conditional Values for the Fifth Embodiment:

$|f1/f|=2.09$ $|f1/f2|=1.17$ $D/|f1|=1.21$ $|f12/f1|=0.97$ $|f22/f2|=1.29$

FIGS. 7–11 show various aberrations of the projection systems of the first through fifth embodiments, respectively. In the diagrams, NA denotes the number of apertures in the screen side, Y denotes the image height at the image display surface LC side, and d denotes the d-line (λ=587.6 nm). Moreover, the sine condition is represented by a broken line in the spherical aberration diagram. In the astigmatism diagram, the meridional image surface is represented by a broken line and the sagittal image surface is represented by a continuous line.

Figure 7A:
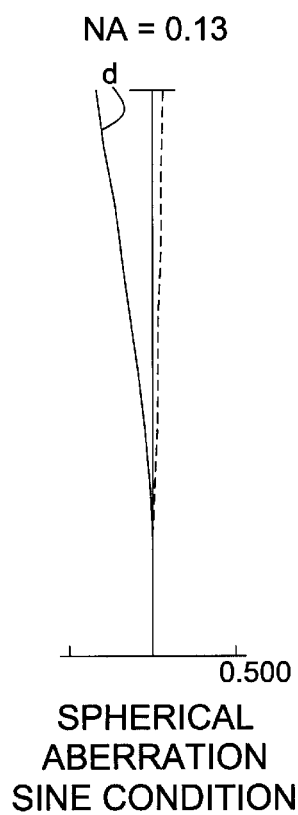
FIG. 7 shows aberration diagrams for the projection lens system of the first embodiment of the present invention.
Figure 7B:
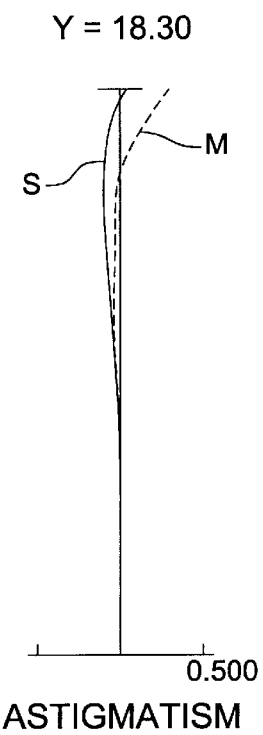
Figure 7C:
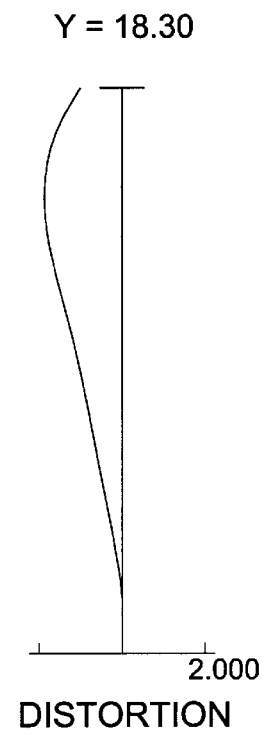
Figure 8A:
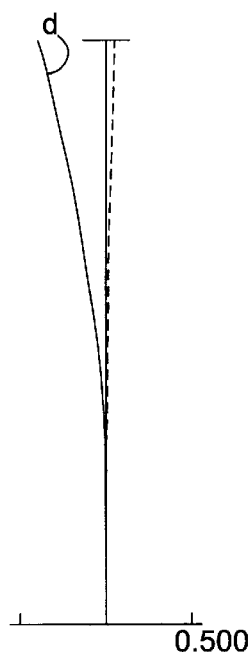
FIG. 8 shows aberration diagrams for the projection lens system of the second embodiment of the present invention.
Figure 8B:
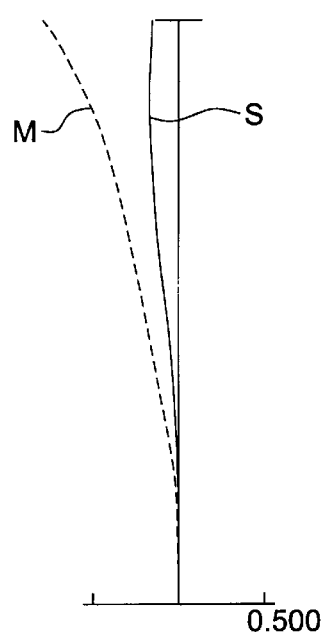
Figure 8C:
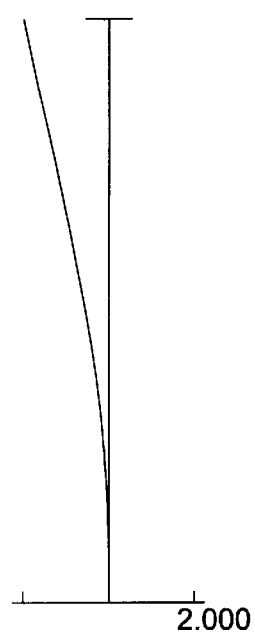
Figure 9A:
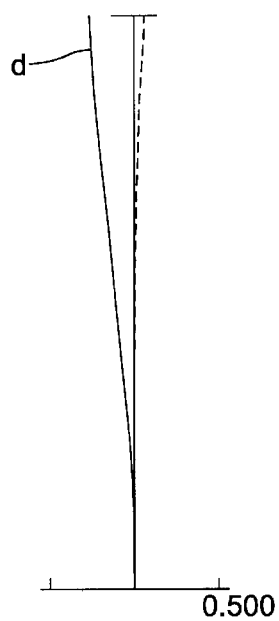
FIG. 9 shows aberration diagrams for the projection lens system of the third embodiment of the present invention.
Figure 9B:
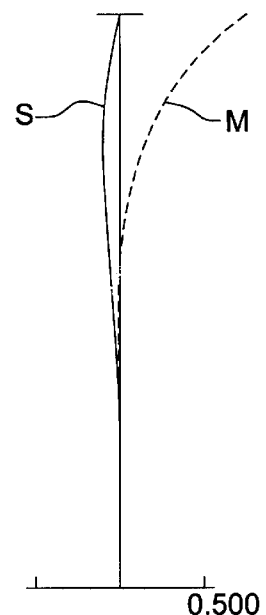
Figure 9C:
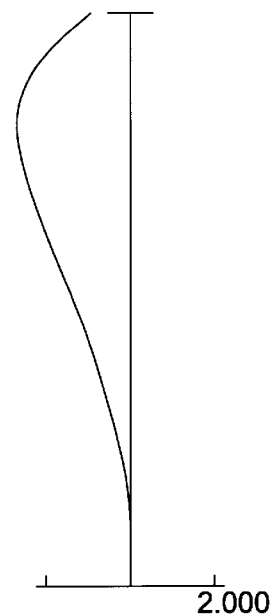
Figure 10A:
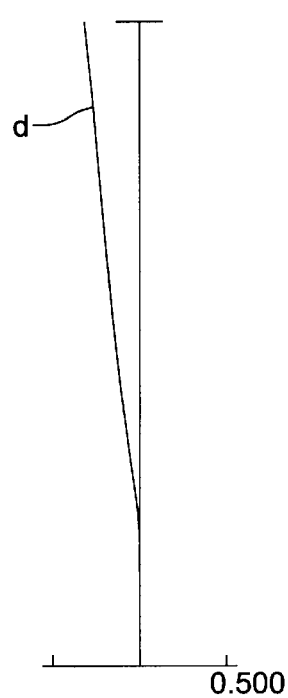
FIG. 10 shows aberration diagrams for the projection lens system of the fourth embodiment of the present invention.
Figure 10B:
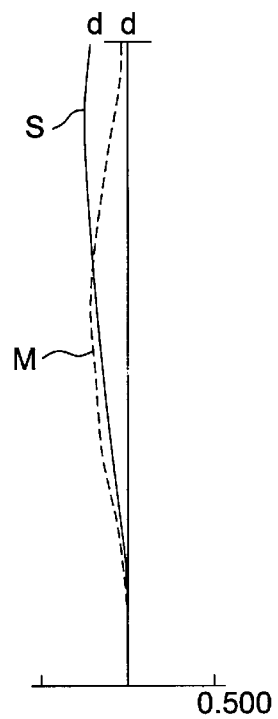
Figure 10C:
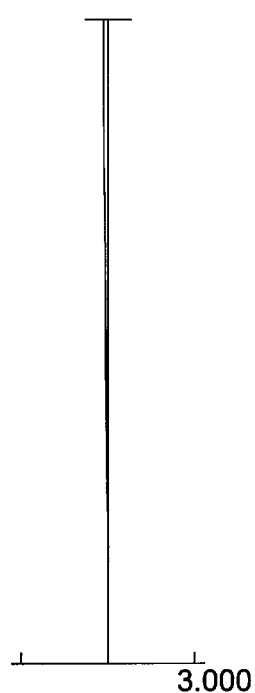
Figure 12:
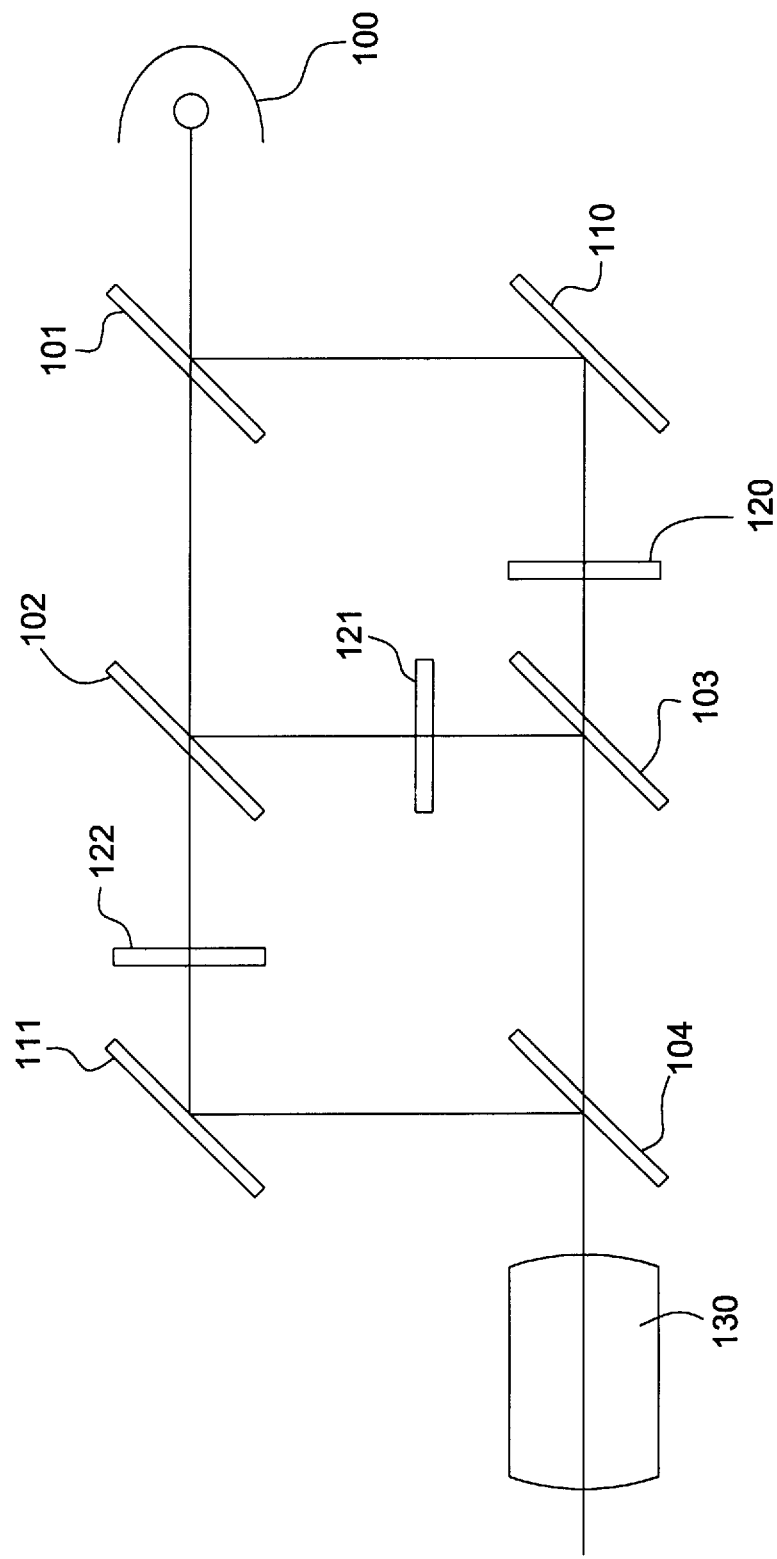
FIG. 12 is a schematic view of a known projection apparatus.

As shown in FIGS. 7–9, although the entire field angle achieves a wide field angle of about 72°, the value of back focus is small at about 32 mm–50 mm, demonstrating a superior optical performance for the present invention.

Accordingly, miniaturization of the entire projection apparatus can be achieved without sacrificing superior optical performance over a wide field angle.

As explained above, the present invention provides a compact projection lens system with small value of back focus, a wide angle, superior telecentric characteristics, and small distortion. Moreover, the present invention achieves superior optical performance over a wide field angle and enables miniaturization of the entire projection apparatus.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A projection lens system for projecting an image from an image display surface onto a screen, comprising in order from a screen side of the projection lens system:

a first lens group having a negative refractive power and including at least one lens;

a second lens group having a positive refractive power and including at least two cemented lens components having cemented surfaces with opposite signs for a radius of curvature of the cemented surfaces; and wherein a focal length f of the projection lens system, a focal length f1 of the first lens group, and a focal length f2 of the second lens group satisfy the following conditional formulas:

$1<|f1|/f<4$ and $0.5<|f1|/f2<3$.

2. The projection lens system according to claim 1, wherein each of the first lens group and the second lens group comprises at least one aspherical lens.

3. The projection lens system according to claim 1, wherein a distance D between the first lens group and the second lens group and the focal length f1 of the first lens group satisfy the conditional formula:

$0.7<D/|f1|<1.6$.

4. The projection lens system according to claim 3, wherein the first lens group comprises, in the following order from a screen side, an aspherical positive lens and a negative lens.

5. The projection lens system according to claim 1, wherein the first lens group comprises, in the following order from a screen side, an aspherical positive lens and a negative lens.

6. A projection lens system for projecting an image from an image display surface onto a screen, comprising in order from a screen side of the projection lens system:

a first lens group having a negative refractive power and including at least one lens;

a second lens group having a positive refractive power and including at least one lens; and wherein a focal length f of the projection lens system, a focal length f1 of the first lens group, and a focal length f2 of the second lens group satisfy the following conditional formulas:

$1<|f1|/f<4$ and
$0.5<|f1|/f2<3$, and the second lens group comprises, in the following order from a screen side, an aspherical positive lens, a positive lens, and at least two cemented lens components.

7. The projection lens system according to claim 6, wherein a distance D between the first lens group and the second lens group and the focal length f1 of the first lens group satisfy the conditional formula:

$0.7<D/|f1|<1.6$.

8. The projection lens system according to claim 6, wherein the first lens group comprises, in the following order from a screen side, an aspherical positive lens and a negative lens.

9. A projection lens system for projecting an image from an image display surface onto a screen, comprising in order from a screen side of the projection lens system:

a first lens group having a negative refractive power and including at least one lens;

a second lens group having a positive refractive power and including at least one lens; and wherein a focal length f of the projection lens system a focal length f1 of the first lens group, and a focal length f2 of the second lens group satisfy the following conditional formulas:

$1<|f1|/f<4$ and $0.5<|f1|/f2<3$, a distance D between the first lens group and the second lens group and the focal length f1 of the first lens group satisfy the conditional formula:

$0.7<D/|f1|<1.6$, the first lens group comprises, in the following order from a screen side, an aspherical positive lens and a negative lens, and a focal length f12 of the negative lens in the first lens group satisfies the following conditional formula:

$0.7<|f12|/|f1|<1.2$.

10. The projection lens system according to claim 9, wherein the second lens group comprises a cemented lens.

11. A projection lens system for projecting an image from an image display surface onto a screen, comprising in order from a screen side of the projection lens system:

a first lens group having a negative refractive power and including at least one lens;

a second lens group having a positive refractive power and including at least one lens; and wherein a focal length f of the projection lens system a focal length f1 of the first lens group, and a focal length f2 of the second lens group satisfy the following conditional formulas:

$1<|f1|/f<4$ and $0.5<|f1|/f2<3$, a distance D between the first lens group and the second lens group and the focal length f1 of the first lens group satisfy the conditional formula:

$0.7<D/|f1|<1.6$, and the second lens group comprises, in the following order from a screen side, an aspherical positive lens, a positive lens, and a cemented lens having a negative meniscus lens and a positive lens.

12. The projection lens system according to claim 11, wherein a focal length f22 of the positive lens satisfies the following conditional formula:

$0.8<f22/f2<2$.

13. The projection lens system according to claim 11, wherein a focal length f23 of the cemented lens in the second lens group and a focal length f22 of the positive lens satisfy the following conditional formula:

$2<|f23|/f22$.

14. A projection lens system for projecting an image from an image display surface onto a screen, comprising in order from a screen side of the projection lens system:

a first lens group having a negative refractive power and including at least one lens;

a second lens group having a positive refractive power and including at least one lens; and wherein a focal length f of the projection lens system, a focal length f1 of the first lens group, and a focal length f2 of the second lens group satisfy the following conditional formulas:

$$1<|f1|/f<4$$

and $$0.5<|f1|/f2<3,$$

the first lens group comprises, in the following order from a screen side, an aspherical positive lens and a negative lens, and the second lens group comprises, in the following order from a screen side, an aspherical positive lens, a positive lens, and a cemented lens having a negative meniscus lens and a positive lens.

15. The projection lens system according to claim 14, wherein a focal length f12 of the negative lens in the first lens group satisfies the following conditional formula:

$$0.7<|f12|/|f1|<1.2.$$

16. A projection lens system for projecting an image from an image display surface onto a screen, comprising in order from a screen side of the projection lens system:

a first lens group having a negative refractive power and including at least one lens;

a second lens group having a positive refractive power and including at least one lens; and wherein a focal length f of the projection lens system a focal length f1 of the first lens group, and a focal length f2 of the second lens group satisfy the following conditional formulas:

$$1<|f1|/f<4$$

and $$0.5<|f1|/f<3,$$

and the second lens group comprises, in the following order from a screen side, an aspherical positive lens, a positive lens, and a cemented lens having a negative meniscus lens and a positive lens.

17. The projection lens system according to claim 16, wherein a focal length f22 of the positive lens satisfies the following conditional formula:

$$0.8<f22/f21<2.$$

18. The projection lens system according to claim 16, wherein a focal length f23 of the cemented lens in the second lens group and a focal length f22 of the positive lens satisfy the following conditional formula:

$$2<|f23|/f22.$$

19. A projection lens system, comprising in order from a screen side:

a first lens group with a negative refractive power, disposed closest to the screen side, and including a first aspherical lens and a lens;

a second lens group with a positive refractive power, juxtaposed the first lens group, and including a second aspherical lens and a cemented lens;

wherein said first lens group has a first concave lens surface facing toward the second lens group the first concave lens surface is closest to said second lens group;

wherein said second lens group has a second concave lens surface facing toward the first lens group the second concave lens surface is closest to said first lens group; and wherein a focal length f of the projection lens system, a focal length f1 of the first lens group, a focal length f2 of the second lens group, and a distance D between the first lens group and the second lens group, satisfy the following conditions:

$$1<|f1|/f<4,$$

$$0.5<|f1|/f2<3,$$

and $$0.7<D/|f1|<1.6.$$

* * * * *